United States Patent
Strong et al.

(10) Patent No.: US 10,819,714 B2
(45) Date of Patent: *Oct. 27, 2020

(54) ENDPOINT DETECTION AND RESPONSE SYSTEM WITH ENDPOINT-BASED ARTIFACT STORAGE

(71) Applicant: Cylance Inc., Irvine, CA (US)

(72) Inventors: Homer Valentine Strong, Irvine, CA (US); Ryan Permeh, Laguna Hills, CA (US); Samuel John Oswald, Portland, OR (US)

(73) Assignee: Cylance Inc., Irvine, CA (US)

( * ) Notice: Subject to any disclaimer, the term of this patent is extended or adjusted under 35 U.S.C. 154(b) by 314 days.

This patent is subject to a terminal disclaimer.

(21) Appl. No.: 15/961,659

(22) Filed: Apr. 24, 2018

(65) Prior Publication Data

US 2018/0316708 A1 Nov. 1, 2018

Related U.S. Application Data

(60) Provisional application No. 62/490,467, filed on Apr. 26, 2017, provisional application No. 62/490,480, filed on Apr. 26, 2017.

(51) Int. Cl.
*H04L 29/06* (2006.01)
*G06F 21/55* (2013.01)
(Continued)

(52) U.S. Cl.
CPC ............ *H04L 63/14* (2013.01); *G06F 21/552* (2013.01); *G06F 21/554* (2013.01); *G06N 5/046* (2013.01);
(Continued)

(58) Field of Classification Search
CPC . H04L 63/14; H04L 63/1425; H04L 63/1433; H04L 63/20; H04L 43/04;
(Continued)

(56) References Cited

U.S. PATENT DOCUMENTS 6,678,679 B1 * 1/2004 Bradford ............. G06F 16/3326
6,967,612 B1    11/2005 Gorman et al.
(Continued)

FOREIGN PATENT DOCUMENTS

EP       2667337 A2    11/2013
WO    2016/109005 A2     7/2016
(Continued)

OTHER PUBLICATIONS

Mishra et al., "Intrusion detection techniques in cloud environment: A survey," Journal of Network and Computer Applications 77:18-47 (2017).
(Continued)

*Primary Examiner* — Catherine Thiaw
(74) *Attorney, Agent, or Firm* — Jones Day

(57) ABSTRACT

Each of a plurality of endpoint computer systems monitors data relating to a plurality of events occurring within an operating environment of the corresponding endpoint computer system. The monitoring can include receiving and/or inferring the data using one or more sensors executing on the endpoint computer systems Thereafter, for each endpoint computer system, artifacts used in connection with the events are stored in a vault maintained on such endpoint computer system. A query is later received by at least a subset of the plurality of endpoint computer systems from a server. Such endpoint computer systems, in response, identify and retrieve artifacts within the corresponding vaults response to the query. Results responsive to the query including or characterizing the identified artifacts is then provided by the endpoint computer systems receiving the query to the server.

20 Claims, 8 Drawing Sheets

US 10,819,714 B2
Page 2

(51) Int. Cl.
*H04L 12/26* (2006.01)
*G06N 5/04* (2006.01)
*G06N 20/00* (2019.01)
*G06F 16/28* (2019.01)
*G06F 21/31* (2013.01)

(52) U.S. Cl.
CPC ............ *G06N 20/00* (2019.01); *H04L 43/04* (2013.01); *H04L 63/1425* (2013.01); *H04L 63/1433* (2013.01); *H04L 63/20* (2013.01); *G06F 16/285* (2019.01); *G06F 21/31* (2013.01)

(58) Field of Classification Search
CPC ...... G06F 21/552; G06F 21/554; G06F 21/31; G06N 20/00; G06N 5/046
See application file for complete search history.

(56) References Cited

U.S. PATENT DOCUMENTS

| | | | |
|---|---|---|---|
| 7,219,090 B2* | 5/2007 | Travis, Jr. ............. | G06F 16/951 |
| 9,516,053 B1 | 12/2016 | Sudhakar et al. | |
| 2007/0033273 A1 | 2/2007 | White et al. | |
| 2009/0089592 A1 | 4/2009 | Kudo | |
| 2012/0278341 A1* | 11/2012 | Ogilvy .................. | G06F 16/313 |
| | | | 707/749 |
| 2014/0114942 A1* | 4/2014 | Belakovskiy ......... | G06F 16/328 |
| | | | 707/706 |
| 2014/0189776 A1 | 7/2014 | Diehl | |
| 2014/0215621 A1 | 7/2014 | Xaypanya et al. | |
| 2014/0344264 A1* | 11/2014 | Kenna ............... | G06F 16/90328 |
| | | | 707/731 |
| 2015/0142732 A1* | 5/2015 | Pace ................... | G06F 16/5838 |
| | | | 707/609 |
| 2015/0163121 A1 | 6/2015 | Mahaffey et al. | |
| 2016/0080397 A1 | 3/2016 | Bacastow et al. | |
| 2016/0117470 A1* | 4/2016 | Welsh ................... | G16H 20/10 |
| | | | 705/3 |
| 2016/0127417 A1 | 5/2016 | Janssen | |
| 2016/0330180 A1 | 11/2016 | Egorov et al. | |
| 2017/0134397 A1 | 5/2017 | Dennison et al. | |
| 2017/0249461 A1 | 8/2017 | Permeh et al. | |
| 2017/0249462 A1 | 8/2017 | Permeh et al. | |
| 2018/0191766 A1* | 7/2018 | Holeman ............ | G06F 21/6245 |
| 2018/0196942 A1 | 7/2018 | Kashyap et al. | |
| 2018/0316691 A1 | 11/2018 | Strong et al. | |

FOREIGN PATENT DOCUMENTS

| | | |
|---|---|---|
| WO | 2017/147300 A1 | 8/2017 |
| WO | 2018/132425 A1 | 7/2018 |
| WO | 2018/200451 A1 | 11/2018 |
| WO | 2018/200458 A1 | 11/2018 |

OTHER PUBLICATIONS

Patcha and Park, "An overview of anomaly detection techniques: Existing solutions and latest technological trends," Computer Networks 51(12):3448-3470 (2007).

Patent Cooperation Treaty, International Search Report for for International Application PCT/US2018/029041 dated Jun. 13, 2018 (5 pages).

Patent Cooperation Treaty, Written Opinion of the International Searching Authority for International Application PCT/US2018/029041, dated Jun. 13, 2018 (10 pages).

Angelini et al., "An Attack Graph-based On-line Multi-Step Atack Detector," Proceedings of the 19th International Conference on Distributed Computing and Netoworking, Association for Computing Machinery, Jan. 4-7, 2018, pp. 1-10.

Patent Cooperation Treaty, International Search Report for for International Application PCT/US2017/019142 dated Jul. 7, 2017 (6 pages).

Patent Cooperation Treaty, Written Opinion of the International Searching Authority for International Application PCT/US2017/019142, dated Jul. 7, 2017 (9 pages).

Schneier et al., "Secure Audit Logs to Support Computer Forensics," ACM Transactions on Information and System Security, 2(2):159-176 (1999).

Hodo et al., "Shallow and Deep Networks Intrusion Detection System: A Taxonomy and Survey," Jan. 9, 2017 (Jan. 9, 2017), Retrieved from the Internet: URL: https://arxiv.org/ftp/arxiv/papers/1701/1701.02145.pdf [retrieved on Mar. 13, 2018].

Mishra et al., "Intrusion detection techniques in cloud environment: A survey," Journal of Network and Computer Applications 77:18-47 (2016).

Mohan et al., "Complex Event Processing Based Hybrid Intrusion Detection System," 2015 3rd International Conference on Signal Processing, Communication and Networking (ICSCN), IEEE, Mar. 26, 2015 (Mar. 26, 2015), pp. 1-6, [retrieved on Mar. 13, 2018].

Patcha et al., "An overview of anomaly detection techniques: Existing solutions and latest technological trends," Computer Networks 51(12):3448-3470 (2007).

Patent Cooperation Treaty International Search Report for International Application No. PCT/US2018/013093, dated Mar. 26, 2018 (4 pages).

Patent Cooperation Treaty International Search Report for International Application No. PCT/US2018/029051, dated Jul. 11, 2018 (5 pages).

Patent Cooperation Treaty Written Opinion of the International Searching Authority for International Application No. PCT/US2018/013093, dated Mar. 26, 2018 (6 pages).

Patent Cooperation Treaty Written Opinion of the International Searching Authority for International Application No. PCT/US2018/029051, dated Jul. 11, 2018 (10 pages).

Vasudeo et al., "IMMIX-intrusion detection and prevention system," 2015 International Conference on Smart Technologies and Management for Computing, Communication, Controls, Energy and Materials (ICSTM), IEEE, May 6, 2015 (May 6, 2015), pp. 96-101, [retrieved on Aug. 26, 2015].

* cited by examiner

| | | | 410 ☑ Exact Matching |
|---|---|---|---|
| 🔍 | Search Team | evil.exe | |
| △ | Artifact | File | 420 ▸ |
| ◁ | Facet | Path | 430 ▸ |
| 🗂 | Zone | [×] Marketing (642) [×] HR (32) | 440 [×] ▸ |
| ⓘ | Name | Name this query | 450 |
| ≡ | Description | Querying Zones for ev| | 460 |

Query 674 devices in zones HR, Marketing for a File that has a Path of evil.exe

SUBMIT QUERY

| Name: | evil.exe-File-Path-010916-153301 | Term: | "evil.exe" | Date Range: | 03/13/2016 - 03/22/2016 |
|---|---|---|---|---|---|
| Description: | evil.exe launched 3/22, searching 4 'critical' zones to see if it exits. | Artifact: | File | Devices Queried: | 45,103 |
| Date Created: | 3/22/16 15:32:21 Z | Facet: | Path | Devices with Results: | 145 |
| Created By: | user@comapny.com | Zones: | Engineering, HR, Marketing, Sales | Total Results: | 745 |

LAST UPDATED 03/30/16 AT 03:22 PM PST

| Filter term | | Search | | Export Results | | Delete Query | | | |
|---|---|---|---|---|---|---|---|---|---|

| PATH ◆ | CREATED DATE ◆ | MD5 ◆ | SHA256 ◆ | DEVICE NAME ◆ | OWNER ◆ | |
|---|---|---|---|---|---|---|
| C:\windows\system32\evil.exe | 2017-03-08 18:16:26Z | 0F97C5BD7D2FCBF26A69CBAEC389E Search Google \| Check Virus Total | 93B2ED4004ED5F7F3039DD7ECBD22C7E4E 24B6373B4D9EF8D6E45A179B13A5E8 | Desktop-Win 11-01c | NT SERVICE \TrustedInstaller | Actions ∨ |
| C:\windows\system32\evil.exe | 2010-11-06 01:48:49Z | CFB8C673F9188F9466E76C6972191E0 Search Google \| Check Virus Total | 93B2ED4004ED5F7F3039DD7ECBD22C7E4E 24B6373B4D9EF8D6E45A179B13A5E8 | Desktop-Win 11-01c | NT AUTHORITY \SYSTEM | Actions ⌄ |
| ⊚ Focus Data Pending | | ⇪ Request File Download | ⊘ Globally Quarantine File | | ⊕ Lockdown Device | |
| C:\windows\system32\evil.exe | 2010-11-06 01:48:49Z | 0F97C5BD7D2FCBF26A69CBAEC389E Search Google \| Check Virus Total | 93B2ED4004ED5F7F3039DD7ECBD22C7E4E 24B6373B4D9EF8D6E45A179B13A5E8 | Laptop-Win 10-xx3 | NT SERVICE \TrustedInstaller | Actions ∨ |
| C:\windows\system32\hack32\evil.exe | 2010-11-06 01:48:49Z | CFB8C673F9188F9466E76C6972191E0 Search Google \| Check Virus Total | 93B2ED4004ED5F7F3039DD7ECBD22C7E4E 24B6373B4D9EF8D6E45A179B13A5E8 | Desktop-WinXP-bb | NT SERVICE \SYSTEM | Actions ∨ |
| C:\windows\system32\evil.exe | 2010-11-06 01:48:49Z | 0F97C5BD7D2FCBF26A69CBAEC389E Search Google \| Check Virus Total | 93B2ED4004ED5F7F3039DD7ECBD22C7E4E 24B6373B4D9EF8D6E45A179B13A5E8 | Desktop-WinXP-bb | NT SERVICE \SYSTEM | Actions ∨ |
| ⊘ C:\windows\system3264\evil.exe | 2010-11-06 01:48:49Z | CFB8C673F9188F9466E76C6972191E0 Search Google \| Check Virus Total | 93B2ED4004ED5F7F3039DD7ECBD22C7E4E 24B6373B4D9EF8D6E45A179B13A5E8 | Desktop-OSX-13b | NT SERVICE \SYSTEM | Actions ∨ |
| ⊘ C:\windows\system32sO\evil.exe | 2010-11-06 01:48:49Z | 0F97C5BD7D2FCBF26A69CBAEC389E Search Google \| Check Virus Total | 93B2ED4004ED5F7F3039DD7ECBD22C7E4E 24B6373B4D9EF8D6E45A179B13A5E8 | Desktop-OSX-13b | NT SERVICE \TrustedInstaller | Actions ∨ |
| C:\windows\evil.exe | 2010-11-06 01:48:49Z | CFB8C673F9188F9466E76C6972191E0 Search Google \| Check Virus Total | 93B2ED4004ED5F7F3039DD7ECBD22C7E4E 24B6373B4D9EF8D6E45A179B13A5E8 | Laptop-Win11-32a | NT SERVICE \SYSTEM | Actions ∨ |
| C:\windows\evil.exe | 2010-11-06 01:48:49Z | CFB8C673F9188F9466E76C6972191E0 Search Google \| Check Virus Total | 93B2ED4004ED5F7F3039DD7ECBD22C7E4E 24B6373B4D9EF8D6E45A179B13A5E8 | Laptop-Win11-32a | NT AUTHORITY \TrustedInstaller | Actions ∨ |

|◀ ◀ 1 ▶ ▶| 10 ▼ Items per page       Showing 1-9 of 9 items

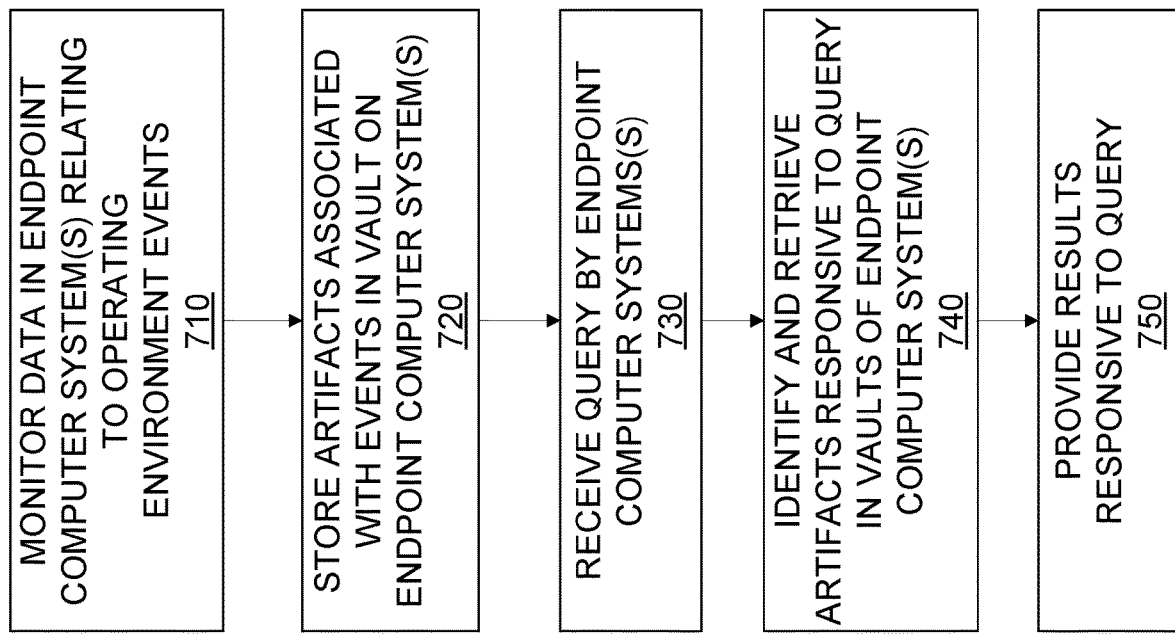

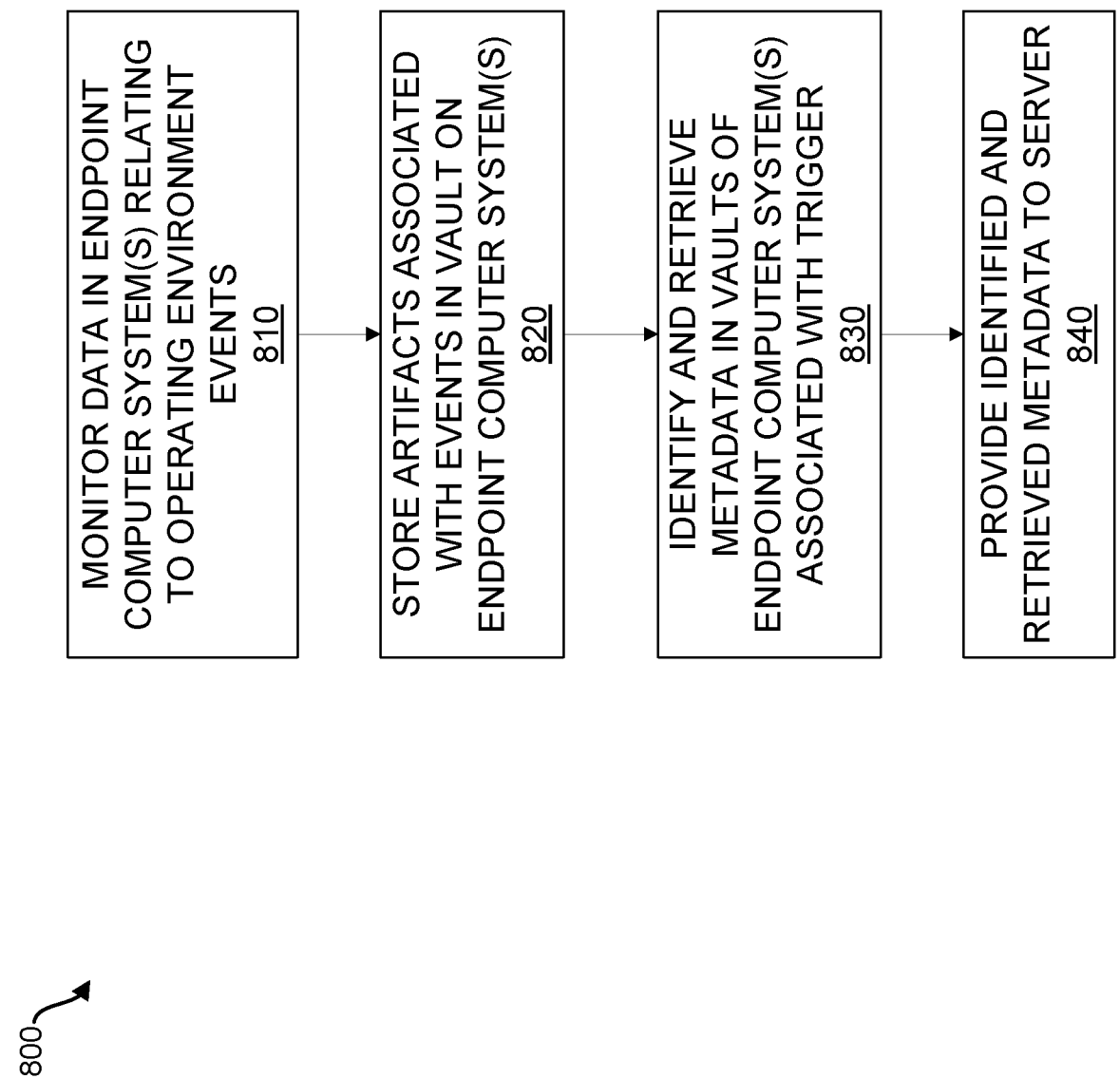

ENDPOINT DETECTION AND RESPONSE SYSTEM WITH ENDPOINT-BASED ARTIFACT STORAGE

RELATED APPLICATIONS

The current application claims priority to U.S. Pat. App. Ser. Nos. 62/490,467 and 62/490,480 both filed on Apr. 26, 2017; the contents of both of which are hereby fully incorporated by reference.

TECHNICAL FIELD

The subject matter described herein relates to approaches for retaining and providing access to data characterizing events occurring in a computing environment on an endpoint computer.

BACKGROUND

Detection and/or interdiction (e.g. prevention of execution, downloading, opening or the like or restriction of access rights to unsecured parts of an execution or computing environment such as the main memory, local or networked storage, the operating system, etc.) of potentially dangerous code objects, such as malware, viruses, and other unwanted or untrusted objects, executables, etc., in a software execution environment (e.g. a computer, a server, a mobile device, etc.) may be performed as part of cybersecurity and threat detection, prevention, and/or evaluation strategies. For example, actions performed by or events relating to a computer may be recorded and/or analyzed to provide visibility into factors affecting safe execution, downloads, etc. as well as for characterizing the performance of applications running on a computer, etc.

Retention of data characterizing a history of the operating environment of an endpoint computer (e.g. a desktop or laptop computer, a mobile device such as a phone or a tablet computer, or any other kind of computer device that executes software) including, but not limited to the time preceding and/or during a threat, an attack, a period of less than optimal execution performance, or any other time during which data about events occurring within or relating to the computing environment of the endpoint computer, can be useful in diagnosing one or more of a source, a responsible party, a magnitude of a potential threat, a etc. of malicious code and/or other forms of threats or cyberattacks and can also assist in improving the effectiveness of detection and prevention efforts in addition to providing a record that can be useful in identifying and/or repairing those software components and/or data affected by a threat. Furthermore, retention of such data can be useful in supporting investigations into any type of potentially interesting event or sequence of events on or concerning the endpoint computer, not necessarily limited to threats or malicious code.

Efforts to retain such data can be an important part of computer forensics, which can include processes of examining a system to find malicious code and/or remnants of a malicious attack or other surreptitious activity (e.g. threads, processes, executable files, or the like) that perform unwanted or otherwise damaging operations that may affect a computer, a group of computers, a network, etc.

SUMMARY

In one aspect, each of a plurality of endpoint computer systems monitors data relating to a plurality of events occurring within an operating environment of the corresponding endpoint computer system. The monitoring can include receiving and/or inferring the data using one or more sensors executing on the endpoint computer systems Thereafter, for each endpoint computer system, artifacts used in connection with the events are stored in a vault maintained on such endpoint computer system. A query is later received by at least a subset of the plurality of endpoint computer systems from a server. Such endpoint computer systems, in response, identify and retrieve artifacts within the corresponding vaults response to the query. Results responsive to the query including or characterizing the identified artifacts is then provided by the endpoint computer systems receiving the query to the server.

In addition or in the alternative, the endpoint computer systems can store the events or data characterizing the events in the vault maintained on such endpoint computer system. In such cases, the identifying and retrieving and providing both further include events or the data characterizing the events within the corresponding vaults responsive to the query.

The server can index the received results enabling such results to be re-used for subsequent queries without communicating to some or all of the endpoint computer systems.

The artifacts can be a digital item of interest comprising one or more of a file, a program, network connections, registry keys and values, DNS connections, user agent strings, URLs, drivers, services, users, or a system characteristic.

The monitoring can further include receiving and/or inferring at least some of the data using additional data generated external to the endpoint computer system and received by the endpoint computer system by way of a communications interface.

The storing of the data in the vaults can include determining, based on one or more criteria, to retain in each vault a first subset of the data as more likely to be relevant and to exclude from the corresponding vault and a second subset of the data as more likely to be irrelevant.

The events can include actions occurring on the endpoint computer systems and that involve at least one artifact on the endpoint computer system and/or wherein the event comprises a capture of what occurred at a specific point in time relating to the at least one artifact.

The results can include one or more of one or more times that a particular file was accessed on the corresponding endpoint computer system, how the particular file was used on the corresponding endpoint computer system, when the particular file was first detected on the corresponding endpoint computer system, location of a registry persistence point, and use of a registry by a software routine to allow itself to persist after a reboot of the corresponding endpoint computing system, registry keys being used for malware persistence to survive reboots, files being created or modified with content that can be directly executed or interpreted for execution, files being downloaded that contain executable or interpretable code, processes being created with excessive or unexpected permissions, users with excessive permissions or users obtaining permissions through non-standard mechanisms, network connections that are used in non-standard ways, network connections that are used in ways that exhibit malicious command and control activities, network connections that are used to exfiltrate files that contain sensitive information, network connections that connect to IP addresses that are considered suspect due to geo-location or reputation, processes that exhibit control over or inject code into other processes, and/or processes that change user ownership during execution.

An amount of the data returned as part of the responsive data can be mitigated by interpreting the query at the endpoint computer system and focusing on specific data of the results that are most likely to be relevant to a subject of the query.

The monitoring of data can be performed by one or more sensors that comprise at least one of a kernel mode collector, a removable media sensor, a sensor that collects data about a current state of a computing environment executing on the endpoint computer, a malware detection and/or interdiction process, a user authentication process, a user authentication re-verification process, system event log collector, and/or an operation system event log sensor.

The data can be monitored according to a first set of data collection criteria. Subsequently, if it is determined by a threat detection module that a heightened level of alert is necessary, the data can then be monitored according to a second set of data collection criteria that are broader or otherwise different than the first set of data collection criteria. The threat detection module can include a machine learning component. Such a machine learning component can perform at least one operation selected from determining that the heightened level of alert is necessary, blocking or terminating execution of a process or thread, and/or determining that the alert level can be lowered back to the first set of data collection criteria. The machine learning component can accomplishes the at least one operation by processing data already in the vault to determine that a potentially undesirable event has occurred and/or by processing the monitored data as it is received to determine that a potentially undesirable event is currently occurring.

The endpoint systems can prune data within the vaults meeting pre-determined deletion criteria. The pre-determined deletion criteria can be based on a timestamp or time associated with such data or a size of files or objects within such data.

Implementations of the current subject matter can include, but are not limited to, methods consistent with the descriptions provided herein as well as articles that comprise a tangibly embodied machine-readable medium operable to cause one or more machines (e.g., computers, etc.) to result in operations implementing one or more of the described features. Similarly, computer systems are also described that may include computer hardware (e.g. one or more processors and one or more memories coupled to the one or more processors) to perform the operations described herein. A memory, which can include a non-transitory computer-readable or machine-readable storage medium, may include, encode, store, or the like one or more programs that cause one or more processors to perform one or more of the operations of the methods summarized above and described in more detail elsewhere herein. Computer implemented methods and/or other operations consistent with one or more implementations of the current subject matter can be implemented by one or more data processors residing in a single computing system or multiple computing systems. Such multiple computing systems can be connected and can exchange data and/or commands or other instructions or the like via one or more connections, including but not limited to a connection over a network (e.g. the Internet, a wireless wide area network, a local area network, a wide area network, a wired network, or the like), via a direct connection between one or more of the multiple computing systems, etc.

The current subject matter provides many technical advantages. For example, the current subject matter can provides advantaged over conventional techniques for computer forensic data collection. Such advantages can be provided by use of a vault that is maintained locally on an endpoint computer system and which can be accessible for queries from a local user, a server that accesses the endpoint computer over a network, a computer program or process that provides threat protection (e.g. malware detection and/or interdiction, authentication verification and/or re-verification, etc.) to provide real-time insight into one or more nodes of a network topology to earlier and more precisely identify potentially malicious activity so that appropriate corrective actions can be taken. Stated differently, the current subject matter provides for improved endpoint detection and response with distributed instant querying on each endpoint (thus providing timely insight into the security of the corresponding network(s)). The current subject is also advantageous in that it limits amounts of data transferred between endpoint computer systems and backend computing systems thereby reducing network resource consumption and also reducing storage requirements on back-end servers.

The details of one or more variations of the subject matter described herein are set forth in the accompanying drawings and the description below. Other features and advantages of the subject matter described herein will be apparent from the description and drawings, and from the claims. While certain features of the currently disclosed subject matter are described for illustrative purposes in relation to threat detection and/or prevention in a computer endpoint operating environment, it should be readily understood that such features are not intended to be limiting. The claims that follow this disclosure are intended to define the scope of the protected subject matter.

DESCRIPTION OF DRAWINGS

The accompanying drawings, which are incorporated in and constitute a part of this specification, show certain aspects of the subject matter disclosed herein and, together with the description, help explain some of the principles associated with the disclosed implementations. In the drawings.

FIG. 4 is a view of a graphical user interface to generate a query of a plurality of vaults residing on endpoint computer systems;

FIG. 5 is a first view of a graphical user interface illustrating results of the query of FIG. 4;

FIG. 7 is a process flow diagram illustrating characterization of events occurring in a computing environment; and FIG. 8 is a process flow diagram illustrating data transfer within an endpoint discovery and response system.

When practical, similar reference numbers denote similar structures, features, or elements.

DETAILED DESCRIPTION

Figure 1:
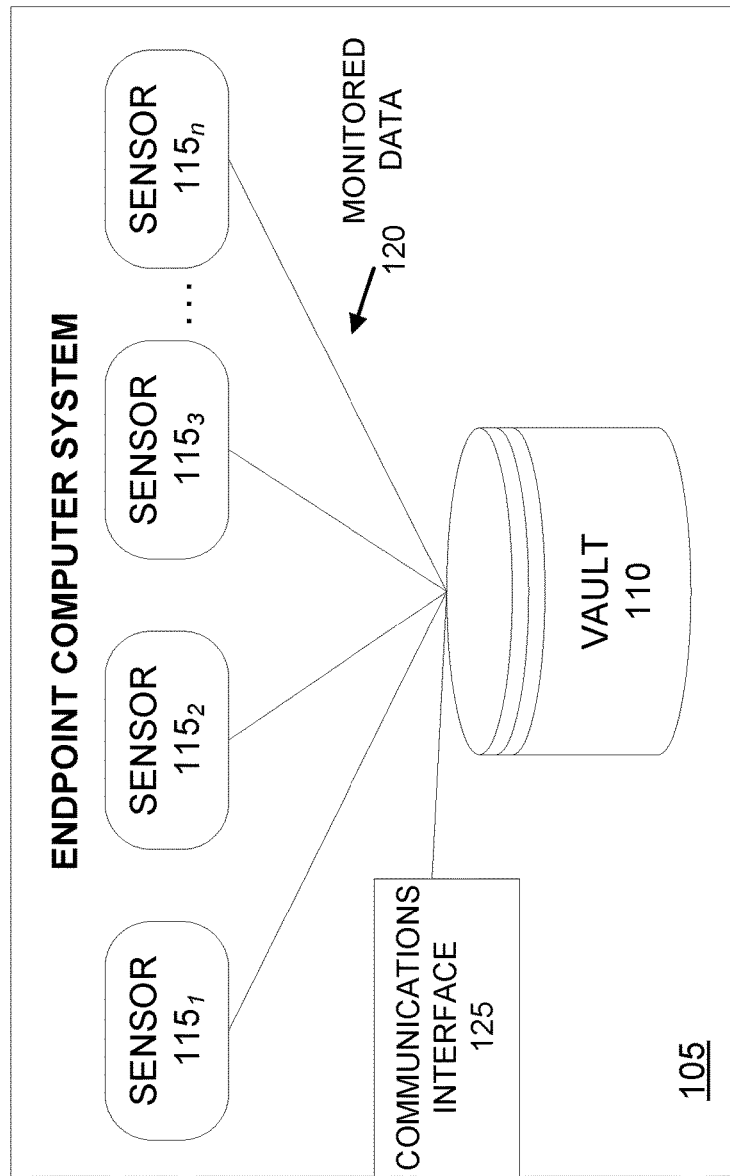
FIG. 1 is a first logic diagram illustrating components of an endpoint computer system.

Current approaches to retaining data regarding potential software-based attacks on a computer generally rely on transmission of data from one or more computer endpoints (which can include, without limitation, laptop or desktop computers, smartphones, tablets, other computing devices, and the like) to a server machine where the data are stored and, if necessary, analyzed, aggregated, etc. Such tactics are generally considered necessary to ensure reliability and security of the collected data (e.g. to ensure that actions of a cyber threat or other attempts to obscure the causes and/or effects of such a threat are not able to delete or corrupt the forensic data). However, maintaining these "forensic" data on a remote system can lead to various disadvantages, such as for example the need to transmit a large amount of data over a network from endpoint computers to one or more remote servers. Furthermore, use of a cloud-based service for such an approach can require the transmission of potentially sensitive data (e.g. the finalized result of an analysis and/or a data aggregation performed at an endpoint computer) regarding computer actions at the endpoint computer, which can be undesirable for various enterprises. An alternative solution consistent with existing approaches can include the use of one or more firewalled servers to which such data are transmitted and on which these data are retained. As used herein, the term forensic data refers generally to any data characterizing events, files in a computing environment of one or more endpoint computers. At its broadest limit, any data relating to artifacts, events, etc. on an endpoint computer can be included in the term "forensic data." Forensic data are also generally referred to herein as "data" or "data relating to events occurring within an operating environment of an endpoint computer system."

When an "unauthorized" piece of software tries to execute or when some other form of a cyber threat is detected, execution or other operations of such a threat can be stopped, for example using one or more threat identification, detection, and/or prevention technologies. For example, the corresponding process or processes can be terminated or suspended, a particular file can be deleted, a user can be logged off the endpoint computer system or other system/software application, registry keys can be deleted and the like. In other examples, actions relating to user authentication and/or re-verification of user authentication for a user who has previously been authenticated for access to one or more system resources (e.g. operating system access, ability to execute one or more applications or other programs, ability to read to/write from/execute within system memory, access to data and/or other information/files/programs on storage devices, network resource usage, etc.) of the endpoint computer system 105 and/or of a network to which the endpoint computing system is connected or otherwise able to access.

As used herein, the term user authentication or user authentication process generally refers to any type of credential verification and/or multi-factor authentication process that may be employed on an endpoint computer system and/or over a network to verify the identity and permissions of a user to access various system resources. Authentication re-verification or an authentication re-verification process generally refers to analysis of a user's interaction with a system and/or network and/or to other factors that can be indicative of a potentially incorrect authentication of the user. In certain implementations of a re-verification process, detection of anomalous behaviors and/or other factors indicative of an error in authentication can cause a user to be required to repeat an authentication process, optionally with a heightened validation or authentication requirement.

FIG. 1 shows a diagram 100 illustrating features of a vault 110 maintained on an endpoint computer system 105 and configured to perform operations consistent with implementations of the current subject matter. The vault 110 can be one or more data stores (e.g., databases, etc.) self-contained within such endpoint computer system 105. For example, the vault 110 can be an encrypted SQLite database. As shown, data 120 relating to events occurring within an operating environment of the endpoint computer system 105 are monitored and added to the vault 110 as artifacts. An artifact is an electronic object of forensic interest such as a process, file, user, registry key, or network connection. An event is an interaction that occurs at a specific time between one or more artifacts (e.g. a file being created or a TCP network connection being created, etc.). The vault 110 is available for use in generating query responses from a variety of potential originators of queries, which are described in more detail below.

The endpoint computer system 105 can include a plurality of sensors $115_{1 \ldots n}$. Such sensors $115_{1 \ldots n}$ can harvest, monitor, or otherwise identify data associated with events for ultimate storage in the vault 110 (i.e., the monitored data 120) as artifacts. Such monitored data 120 can comprise various artifacts for storage in the vault 110 along with metadata characterizing such artifacts.

Example sensors $115_{1 \ldots n}$ include, for example, a kernel mode collector, a removable media sensor, a sensor that collects data about a current state of a computing environment executing on the endpoint computer, a malware detection and/or interdiction process, a user authentication process, and/or a user authentication re-verification process. These sensors can be software-based and/or implemented in hardware.

The monitored data 120 stored in the vault 110 can additionally or in the alternative originate from external sensors/events. Such monitored data 120 can be received via a communications interface 125 that permits the endpoint computer system 105 to communicate over one or more networks with remote computing devices (whether part of an internal corporate network or otherwise).

The artifacts forming part of the monitored data 120 (and derived from the sensors $115_{1 \ldots n}$ and/or the communications interface 125) can take many forms. In one example, the artifacts characterizes operations/processes that lead up to detection of malware on the endpoint computer system 105 by an antivirus tool such as file/data source, associated IP address, user identification, time of day, and the like.

The artifacts can enumerate profiles and rules for firewalls, including Windows Firewall forming part of the network topology in which the endpoint computer system 105 resides.

The artifacts can specify start times, associated users and processes, executables being utilized by the endpoint computer system 105, and the like.

The artifacts can characterize various aspects of the network in which the endpoint computer 105 resides including, without limitation, ARP, DNS requests, URLs for a downloaded file, IP connects, Wi-Fi radios and access points, Bluetooth radios and devices, modifications to HOSTS file, and the like. Such network related data can be received via the communications interface 125 and correlate URLs to IPs, and network activity to running processes. In addition, the network related data can captures information about network cards and static/dynamic routes.

The artifacts can characterizes files used by one of the endpoint computer systems 105 or otherwise transported across the network in which the endpoint computer system 105 resides including, for example, create, modify, delete, established persistence and renamed artifacts along with metadata and file attributes. Such artifact data can be used to correlate file to process relationships.

The artifacts can comprise registry related information of one or more endpoint computer systems 105 including, for example, create, modify, establish persistence and/or delete events for registry keys and values. In some variations, the artifacts can identify more than one hundred persistence points/locations that are used by malware to persist after system reboot. The registry event information can correlates registry keys/values with the process that created them. In addition, the registration event information can correlates persistent registry key/value with the file that is trying to persist through a specialized parser.

The artifacts can also characterize removable media insertion events at an endpoint computer systems 105 along with files being copied to/from and executed. In particular, the artifacts can identify whether the malware detected at a particular endpoint computer systems 105 originated from removable media. The removable media events can also be used to identify source code files and documents being copied to removable media.

The artifacts can also characterize various processes being executed at the endpoint computer system 105. As an example, the artifact data can characterize create, delete, suspend, load, and modify events for processes, threads, and modules. Such artifact can data can be used to correlate processes with originating files, created/modified/deleted files, registry, network activity, and the like. Artifact data can also focuses on resolving Remote Thread Creation where existing processes have threads injected into them. The artifact data can identify DLL injection through Remote Thread Creation of kernel32!LoadLibraryA/W.

The artifact data can also characterize users including user behavior. For example, the artifact data can specify previously logged on users. It can also associate users with actions, including create/modify/delete events. The artifact data can further identify anonymous logins, network logins, off-hour logins, and failed logins. Moreover, the user artifact data can be used to correlate users with malicious/suspicious activity.

Further, the artifact data can provide various device-related information. For example, the artifact data can provide a complete view of the system, including the operating system, installed applications, BIOS, hardware, computer manufacturer, and languages. Device related data can also enumerate loaded drivers and registered services.

The current subject matter is not dependent on any specific type of threat protection technique, authentication verification or re-verification protocol, or security approaches. Rather, such other processes running on the endpoint computer system 105 and/or over a network connection accessible to the endpoint computer system 105 can be used to trigger various activities relating to one or more of monitoring of data relating to events occurring within an operating environment of the endpoint computer system 105, causing generation of query responses based on the data in the vault maintained at the endpoint computer system 105, and the like.

The data monitoring and storing operations described herein can be used to create a standalone record of actions in the vault 110 on the endpoint computer system 105 without any type of threat detection or prevention, authentication, etc. being used on that endpoint computer system 105. In such an example, the operations of the endpoint computer system 105 may not be protected against threats or other kinds of potentially malicious actions. However, if negative or unexpected outcomes occur, the monitored and stored data 120 can be used to diagnose how an attack or other incident occurred and possibly to better inform other threat identification, detection, and/or prevention approaches. Additionally, the monitored and stored data 120 may be used for other purposes, such as for example improving performance, assessing use of network and endpoint computer resources, etc. The descriptions herein with regards to examples of possible uses for the monitored and stored data 120 are not intended to be limiting. The term "monitored" refers generally to any collection or generation of data relating to events occurring within an operating environment of an endpoint computer system 105 (e.g. "forensic data" or other data useful in diagnosing, assessing, etc. one or more outcomes or occurrences on the endpoint computer).

In some implementations of the current subject matter, the vault (e.g. an audit log) can be encrypted such that the monitored data 120 contained therein are protected from alteration and so that the data cannot be readily accessed or otherwise compromised during or after a threat or other event that may require further analysis. A local audit log consistent with implementations of the current subject matter can also be protected against tampering (e.g. deletion of all or part of the data contained therein) by one or more tamper resistant features. Maintaining the audit log as a series or chain of linked data containers, each of which is encrypted and further secured by a cryptographic fingerprint, is one non-limiting example of a tamper resistant feature that can provide these protections.

The encrypting can prevent alteration of data in the audit log, and cryptographic fingerprints of the containers in the series can include anti-deletion features that clearly indicate if one or more containers in the series or chain is improperly deleted. These anti-deletion features can include inclusion (in the cryptographic fingerprint of each container) of a reference or references to the cryptographic fingerprint of at least one preceding container in the series. In other words, a currently active container can include as part of its cryptographic fingerprint a reference to at least the most recently closed container and optionally to more than one (e.g. two, three, four, five, ten, etc.) previously closed containers in the series. In this manner, if a container in the series is deleted, its absence will be readily apparent due to the deleted container being referenced in the cryptographic fingerprint of a later closed container or the currently active container.

In some implementations of the current subject matter, a cryptographic hash is stored in a container envelope, which can also include a fingerprint for both the current and one or more previous containers as well as the data included in the "chunk" of data being retained in that container. Use of a "chunked" approach to storage of the audit log information consistent with implementations of the current subject matter can allow differential backups, as it is generally necessary to back up only those new containers created and/or written to since a previous backup. This container approach can also address a potential technical challenge while encouraging information on a disk or other physical storage medium (e.g. a solid state drive, optical drive, or the like). Because data are continuously added to the audit log as operations of the endpoint computer and other actions and events occur, use of a single contiguous file for storing of audit log information can require that the single file be left open to allow this appending. Certain implementations of the current subject matter can address this potential issue through the use of a contiguous series of data containers in that data containers in the series that have been completed or otherwise filled can be permanently closed to further write operations while only the current container must be left open.

Other forms of tamper resistant features can also be used for the data containers. For example, each data container can also be compressed and signed with a public key (e.g. using RSA-4096 or some similar approach). The combination of the data container plus the signature can also be enciphered (e.g. using AES-256 or some similar approach).

An audit log consistent with implementations of the current subject matter can store raw forensic data in the aforementioned series of linked containers. Forensic data, as used herein, can generally include information about forensically interesting events. These forensic data (e.g. the information about forensically interesting events) can include information relevant to questions of who, what, why, how, and where relating to events occurring on the endpoint computer system 105. For example, "who" can include information about an actor responsible for actions that have occurred. An actor, as used herein, can refer to a user, a program, a function call, a thread, or some other process that causes an event to occur (e.g. a "what").

Information relating to "what" stored in the vault 110 either as artifacts and/or metadata can include records of actions such as network connections, remote side port and/or Internet protocol (IP) addresses, domain name system lookups for a calling thread or process or source of a thread or a process, thread or process execution starts, file writing, URL calls, and the like.

In some examples, recording of data on URL calls can require a browser plug-in. Data regarding an execution start can include information about any calling programs or routines in a process tree, and can include the name of a process, when the process started, and what if any parent processes are involved in the process tree. For example, if process C is started, data regarding a parent process B that called C can be relevant, as can a previous parent process A that called B. This information can be useful forensically as it can allow a reverse traversal of the process tree to find a true originating process and potentially (e.g. based on the content of the audit log) background information such as how the true originating process was first installed (or otherwise because present) on the endpoint computer.

Additionally potentially relevant forensic data made available in the vault 110 as artifacts and/or metadata can include information about the stage, which can generally refer to the context, state, etc. of the endpoint prior to and during a threat or attack. Stage information can include context around one or more actions or events, timing of a thread or process start (e.g. in relation to other threads or processes executing on the endpoint computer and/or other actions or events), a directory from which a thread or process launches, and other potentially interesting contextual information.

Further potentially relevant forensic data made available in the vault 110 as artifacts and/or metadata can include information such as registry keys being used for malware persistence to survive reboots, files being created or modified with content that can be directly executed or interpreted for execution, files being downloaded that contain executable or interpretable code, processes being created with excessive or unexpected permissions, users with excessive permissions or users obtaining permissions through non-standard mechanisms, network connections that are used in non-standard ways, used in ways that exhibit malicious command and control activities, are used to exfiltrate files that might contain sensitive information, or are connecting to IP addresses that are considered suspect due to geo-location or reputation, processes that exhibit control over or inject code into other processes, and/or processes that change user ownership during execution.

Figure 2:
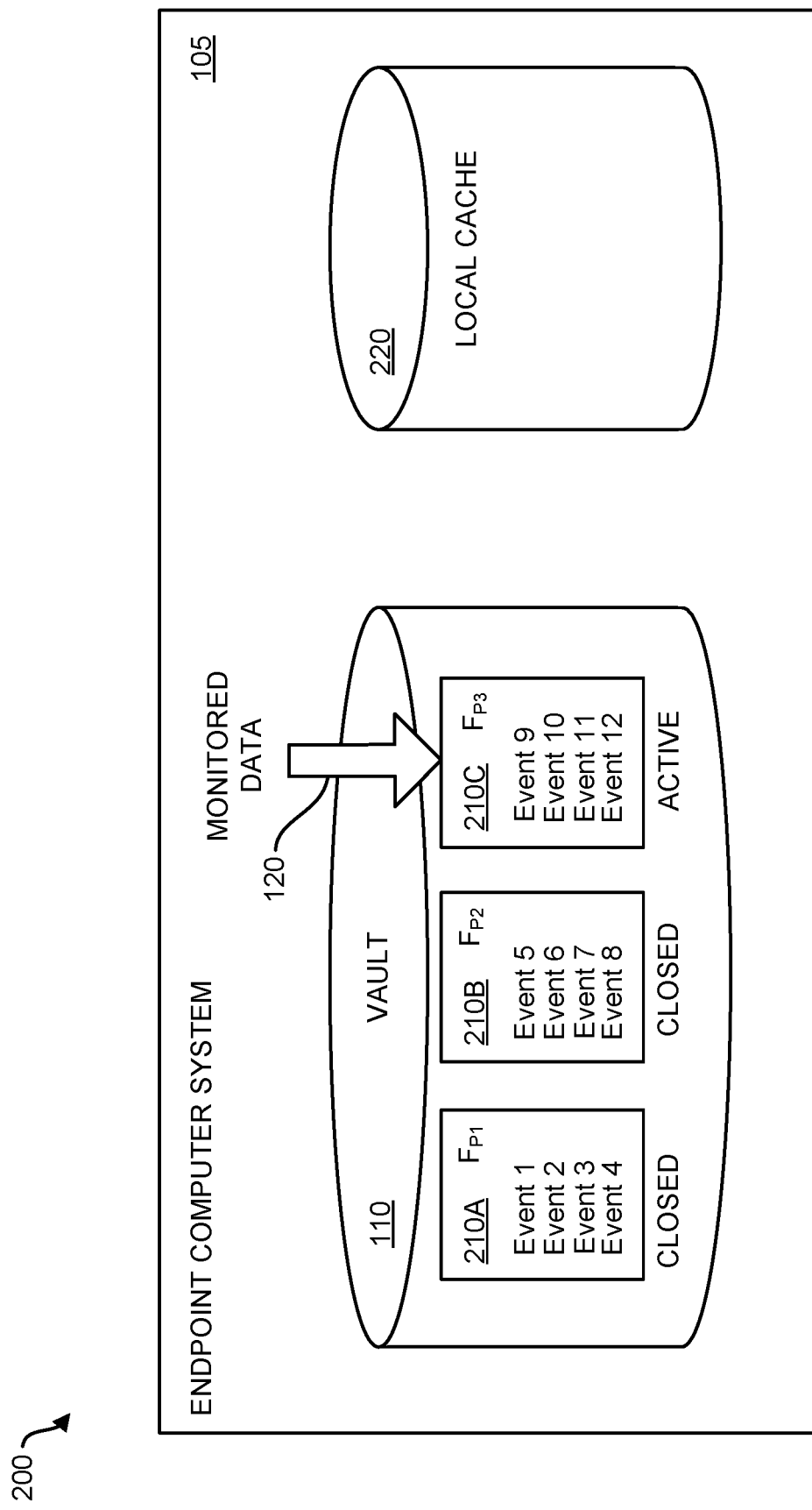
FIG. 2 shows a second logic diagram illustrating components of an endpoint computer system.

The diagram 200 of FIG. 2 shows an example of a vault/audit log 110 that includes a series of containers. Consistent with some implementations of the current subject matter, the audit log is maintained on a local storage of an endpoint computer system 105. In some variations, the audit log can be stored on networked or other external storage that is not physically contained within the hardware of the endpoint computer system 105.

In the example of FIG. 2, three containers 210A, 210B, 210C are shown in the vault/audit log 110. However, it will be readily understood that the series of containers can include any number of containers, and that the number of containers will continue to grow with time as additional events occur at the endpoint computer system 105 and are recorded in the vault/audit log 110. One container (in this example container 210C) is a currently active container to which monitored data 120 are written. In some implementations of the current subject matter, a container can hold a preset amount of data. Alternatively, a container can be configured to hold all of the data generated by the endpoint computer system 105 for a given period of time. When a container is full (e.g. when the preset amount of data is reached or if the predetermined period of time has elapsed), a new container is added to the end of the series of containers and forensic data are written to that new container. The containers 210A, 210B, 210C can all be write-only as discussed above, such that data in a given container cannot be overwritten or deleted. The most recent forensic data are appended to the current active container 210C.

In addition to the vault/audit log 110, which can be stored in a series of containers each including reference to a cryptographic fingerprint of at least one other container in the series as discussed above, FIG. 2 also shows a local cache 220 (which can also be referred to as a time-based local cache 220) that is also maintained on the endpoint computer system 105 concurrently with the writing of the audit log. Similarly to the audit log 110, in some variations, the local cache 220 to be located on storage that is not physically contained within the hardware of the endpoint computer system 105. Unlike the vault/audit log 110, the local cache 220 does not archive a continuous record of forensically relevant data. Instead, the local cache 220 stores a rolling snapshot of such data collected over a preset amount of time, over a preset number of events, over a present amount of stored forensic data, and/or combinations of such approaches immediately preceding the present time. In other words, in some implementations, the local cache 220 can store a trailing record of forensic data collected over the last five minutes (or any other amount of time, which can optionally be configurable). This trailing record of forensic data can include records regarding activities, actions performed, etc. relating to the system. The amount of time can be chosen to have a sufficient duration to capture data preceding some sort of interesting event that may be related to the event. In other examples, the local cache 220 can include a trailing record of a specified number of events or actions leading up to the present. As with the use of time for determining how long to retain forensic data in the local cache 220, the specified number of events can be chosen to be sufficient to capture forensic data preceding but relevant to an event. In still other examples, the local cache 220 can have a fixed memory size that is chosen to be sufficient to retain relevant forensic data relating to and leading up to an event. The parameters of the local cache 220 can also optionally be chosen to incur an acceptably small burden on performance, storage, etc. of the endpoint computer 105.

If a local cache 220 is used, it can be written in a readily queryable format, such as for example as an indexed database (e.g. a BTREE-based date structure, although the approaches described herein are not data structure specific) and can optionally be accessible from a central server or other user interface UI), application programming interface (API), or the like for rapid review, analysis, etc. of data relating to a threat detection or prevention event or to some other unwanted occurrence on the endpoint computer system 105 (or on other endpoint computers system 105 whose data the UI, API, etc. also accesses. The local cache 220 can also be reconstructed from an vault/audit log 110 (e.g. the series of data containers 210A, 210B, 210C, etc.) in the event that the local cache 220 is damaged, deleted, or otherwise compromised.

In an alternative approach consistent with the current subject matter, the vault 110 can be used directly for responding to queries (instead of the local cache 220). However, certain processing of the data retained in the vault 110 can be performed to enhance the speed of query responses and to improve the relevance of the data returned as responsive to a query. For example, one or more machine learning models can be used to analyze data as those data are added to the vault 110 and/or data that have been previously added to the vault. The analyzing of the data can involve an assessment of the likelihood of a given subset of the data being relevant to events that are expected to be of greater interest.

Figure 3:
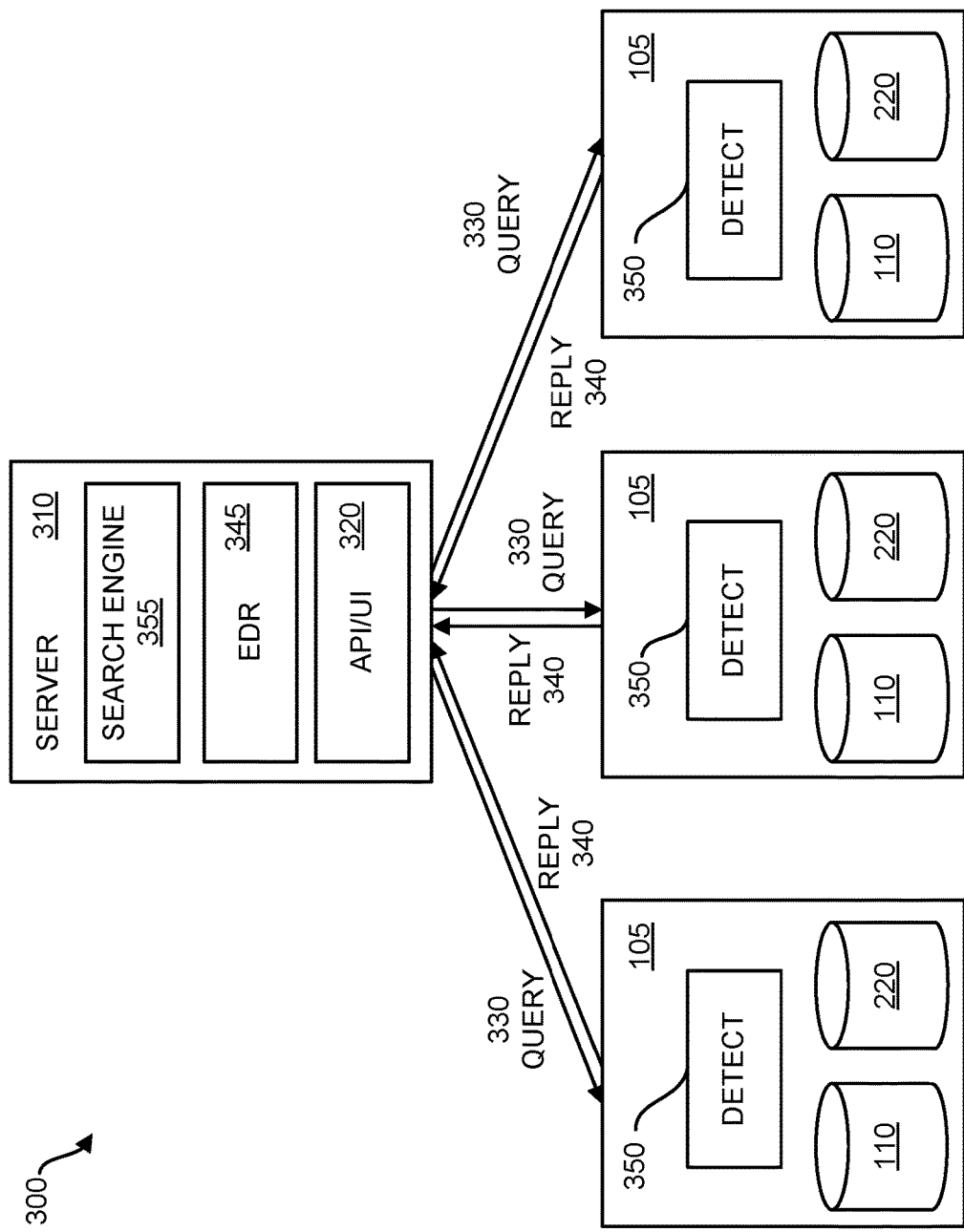
FIG. 3 shows a diagram illustrating a plurality of endpoint computer systems in communication over one or more networks with a server forming part of an endpoint detection and response system.

FIG. 3 shows a diagram 300 illustrating how data stored in the vaults 110 or, alternatively, the local caches 220 if present), on multiple endpoint computers 105 can be queried on demand from a server 310 or other networked machine via an API (or optionally a UI) 320 to provide rapid response to support analyses of the monitored data 120 (e.g. the computer forensic data retained on the endpoint computer systems 105). In this manner, and in contrast to existing approaches that rely on transmission to and storage at a central server for all such data as they are monitored, some implementations of the current subject matter can support at least some local analysis of monitored data 120 for threat evaluation and/or for other purposes. In some implementations of the current subject matter, the API or UI 320 running at the server 310 can send queries 330 of the vault (or, alternatively, the local cache 220, if one is present) at one or more endpoint computer systems 105 and receive query replies 340. It will be understood that the vault/audit log 110 can also or alternatively be queried from another process running on the endpoint computer system 105 itself, such as for example a malware detection and/or interdiction process, a user authentication process, a user authentication re-verification process, or the like.

The server 330 can incorporate a search engine 355 for facilitating querying of the endpoint computer systems 105. The search engine 355 can, for example, be a RESTful search and analytics engine that indexes results of previous queries for re-use in connection with subsequent queries. The search engine 355 can provide a distributed, multi-tenant-capable full-text search engine with an HTTP web interface and schema-free JSON documents. Of particular importance, is that the search engine can provide near real-time search results from the various vaults 105.

Other data schema and routing of queries from the server 330 and responses can be utilized. In operation, a networked query approach as described above can be useful in gathering and/or aggregating relevant summary date regarding events at endpoint computers 105. These query replies 340 can be used in a number of possible ways. In some implementations of the current subject matter, the query replies 340 can be used as input data for improvement of endpoint detection and response (EDR) 345, which can be implemented at the server 310 or on another computer. In other implementations, queries 330 can be triggered by receipt of a report of a recent or in-progress threat or attack on one or more of the endpoint computers 105 and/or as a result of detection of a trend or other emergent situation that may indicate surreptitious or undesirable activity but that may not constitute a threat or attack per se. The query replies 340 can used to gather data on the nature of the attack or threat and potentially to direct a response (e.g. an alert provided to a network administrator, an automated security protocol that the endpoint computer systems 105 are directed to implement, etc.). The summary data (e.g. the query replies 340) transmitted back to the server 310 in response to the queries 330 can optionally include only extracted or aggregated data as opposed to the raw monitored data 120 that is included in the vault/audit log 110. In this manner, the raw monitored data 120 does not need to be transmitted from the endpoint computer 105, thereby ensuring data security and avoiding potential vulnerabilities that might arise due to transmission of raw monitored data 120 over a network.

In some variations, a data collection approach can be further enhanced by inclusion of a threat detection or prevention module 350 or other software functionality on the computer endpoint 105. The threat detection module 350 can include artificial intelligence (i.e., machine learning such as disclosed in U.S. patent application Ser. No. 14/313, 863 filed on Jun. 24, 2014, the contents of which are hereby fully incorporated by reference), a static set of response criteria, or other computing features that operate to expand the scope of the data that are stored in the vault/audit log 110 in response to detection of one or more criteria indicative of a threat or an attack. In other words, while the endpoint computer 105 is perceived by the detection module 350 to be operating in a non-threat or non-attack mode, a first level of data collection can be used for storing data to the vault/audit log 110. If the threat detection module 350 determines that a threat or an attack may be underway or may be imminent, the threat detection module 350 can perform one or more actions, such as for example directing the vault/audit log 110 to monitor data with added details or to add a finer level of resolution and/or causing a change in aggregation and analysis of the monitored data 120. In various implementations of the current subject matter, a threat detection module 350 can include one or more of a malware detection and/or interdiction process, a user authentication process, a user authentication re-verification process, or the like.

The endpoint computer systems 105, in some cases, can only transfer certain data from the vaults 110 to the server 350 in connection with a trigger. Such an arrangement is technically advantageous in that it limits the amount of transferred data until such time as such data may be needed and/or alternatively to reduce a total amount of transferred data (thus resulting lower consumption of network resources including back-end storage requirements). The triggers can take a variety of forms including, for example, the detect module 350 convicting a certain file or data as potentially being malicious. Other triggers can be, for example, an expiration of a timer or a fixed period, the receipt of a query 330 from the server 310.

The data transferred from the vaults 110 can be, for example, the artifacts, the events, and/or metadata characterizing one or both of the artifacts and the events. The data can be transferred using various space-efficient data structures. Example data structure/protocols include, for example, a Bloom filter, HyperLogLog data structure, a Count-Min Sketch, a MinHash data structure, and/or a T-Digest data structure.

The threat detection module 350 can be utilized so that monitoring of data to be added to the vault/audit log 110 can be tuned such that the data consumption and or computational power required for maintenance of the vault/audit log 110 is minimized during periods during which the likelihood of a threat or other attack is low. When the threat detection module 350 indicates that a heightened level of alert is necessary, the vault 110 can monitor larger amounts of data, which would lead to lowered performance of the computer endpoint 105. Additionally or alternatively, at a higher level of alert, additional processing power can be required for aggregation of atomic events into logical views. However, the reduced performance can be a reasonable trade-off for the ability to collect important data around a threat or an attack.

In some implementations of the current subject matter, the threat detection module 350 can also include functionality capable of terminating or remediating threats, and can be capable of doing so from either or both of a lower or heightened level of alert. In addition, such functionality can be capable of determining that a current level of alert is not commensurate with an actual threat state and therefore lowering the current level of alert to improve system (e.g. CPU) performance.

Preceding references to monitoring and/or analysis, aggregation, etc. of data with added detail or added complexity, granularity, etc. can optionally refer to implementation of a broader set of data criteria for collection in the vault/audit log 110. In other words, the vault/audit log 110 can include a first set of data collection criteria that are used during non-threat or non-attack periods, and a second set of data collection criteria that are put into operation when the threat detection module 350 indicates that a threat or attack is in progress, might be imminent, has just occurred, etc. Also as noted above, first analysis and/or aggregation criteria can be applied during "normal" periods, which enhanced, second analysis and aggregation criteria can be applied when the threat detection module 350 indicates that a threat or attack is in progress, might be imminent, has just occurred, etc. While the threat detection module 350 is shown in FIG. 3 as being implemented on the endpoint computers 105, it is within the scope of the current subject matter for this functionality to be implemented at the server 310 or at some other external computing machine.

FIG. 4 is a view 400 of a graphical user interface showing an example form for generating a query, by the server 330, of the vaults 110 on the various endpoint computer systems 105. The form can include various graphical user interface elements such as input boxes, dropdown menus, and the like for generating the query. In particular, an input box 410 can be used to allow a user to enter in one or more alphanumeric strings. Optionally, various other filtering criteria can be specified such as artifact type 420 (files, network connections, processes, users, registry keys, etc.), facets 430 (which are pre-specified as part of a faceted classification system), and zone 440 (which specifies a pre-defined grouping of endpoint computing systems 105 either by attribute or by specific identification). Further, the particular query can be named 450 (so that it can be subsequently reused) and details regarding such query can be provided 460 (to allow for search of previously defined queries for subsequent reuse).

FIG. 5 is a view 500 of a graphical user interface showing the results of the query of FIG. 4. The results can individually each have one or more associated graphical user interface elements which, when activated, cause additional complementary information about the selected result to be displayed. In some cases, the selection of a result can act as a trigger to retrieve event data, artifacts, and/or metadata from a particular endpoint computer system vault.

Figure 6:
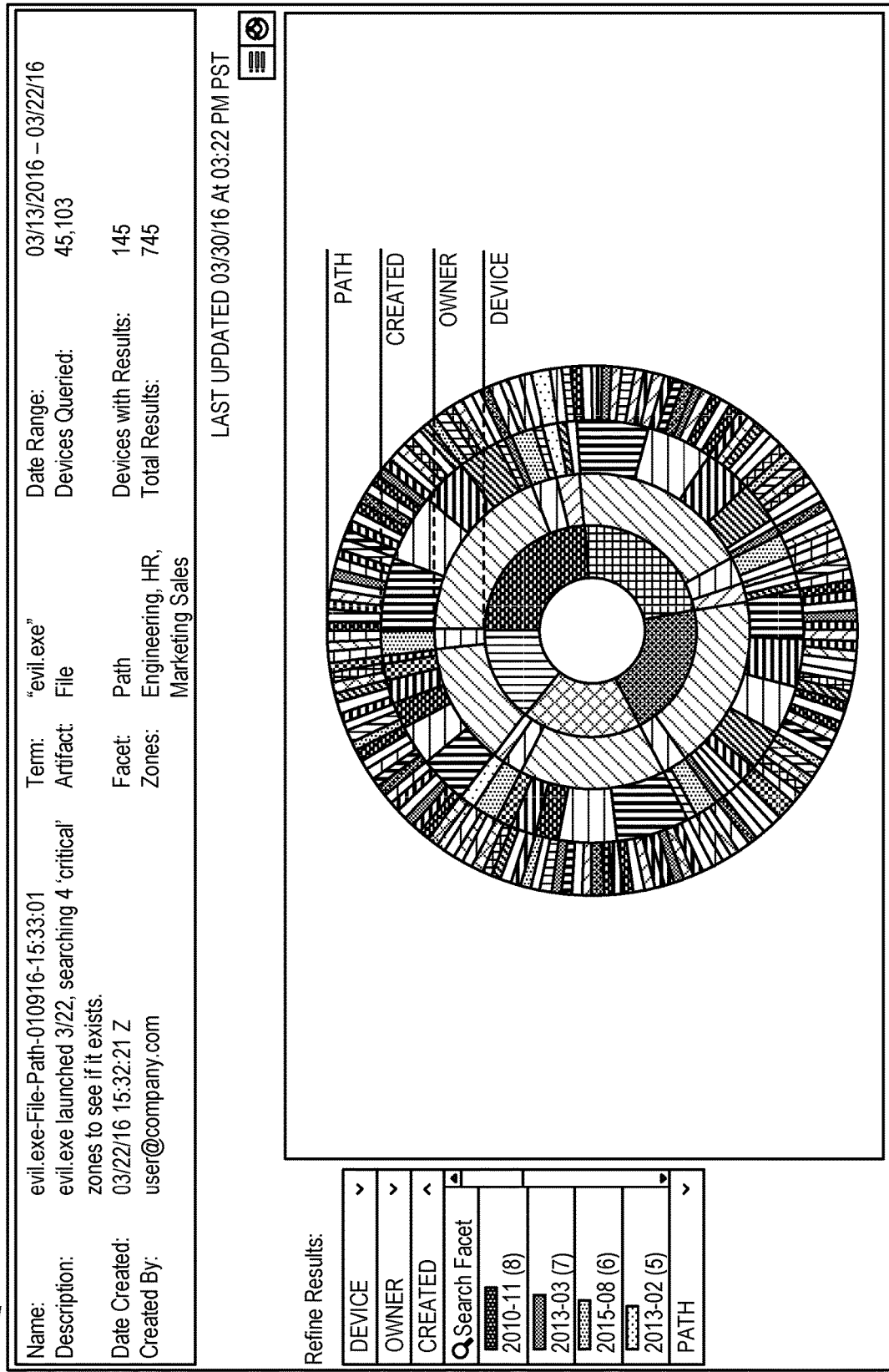
FIG. 6 is a second view of a graphical user interface illustrating results of the query of FIG. 4.

FIG. 6 is a view 600 of a graphical user interface showing a graphical breakdown of the results showing in FIG. 5. Given the table of results in FIG. 5, four different facets of the data are illustrated in a concentric manner. In this example for files, the inner ring is the devices, the second ring is the users, the third ring is hash, and the outer ring is path. The concentric tiles/slices each can individually each have one or more associated graphical user interface elements which, when activated, cause additional complementary information about the selected result to be displayed. In some cases, the selection of a result can act as a trigger to retrieve event data, artifacts, and/or metadata from a particular endpoint computer system vault.

FIG. 7 is a process flow diagram 700 illustrating event characterization as part of endpoint detection and response. Initially, at 710, each of a plurality of endpoint computer systems monitor data relating to a plurality of events occurring within an operating environment of the corresponding endpoint computer system. The monitoring can, for example, include receiving and/or inferring the data using one or more sensors executing on the endpoint computer system. Each endpoint computer system, at 720, stores artifacts used in connection with the events in a vault maintained on such endpoint computer system. Thereafter, at 730, some or all of the plurality of endpoint computer systems receive a query from a server. The endpoint computer systems receiving the query then, at 750, identify and retrieve artifacts within their corresponding vaults that are responsive to the query (if any). Subsequently, at 760, results responsive to the query including or characterizing the identified artifacts are provided to a server by the endpoint computer systems receiving the query and having responsive results.

FIG. 8 is a process flow diagram 800 illustrating an EDR system with efficient data transfer between the endpoint computer system and a backend server in which, at 810, an endpoint computer system monitors data relating to a plurality of events occurring within an operating environment of the endpoint computer system. Such monitoring can include receiving and/or inferring the data using one or more sensors executing on the endpoint computer system. In connection with such monitoring, at 820, the endpoint computer stores artifacts used in connection with the plurality of events in a vault maintained on such endpoint computer system. Next, at 830 and in response to the trigger, the endpoint computer system identifies and retrieves metadata characterizing artifacts associated with the trigger from the vault. The identified and retrieved metadata can later be provided, at 840, by the endpoint computer system to a remote server. In some variations, events and artifact or event metadata can also be stored and retrieved.

The subject matter can utilize one or more aspects described in U.S. patent application Ser. No. 15/354,966 filed on 17 Nov. 2016, which claims priority to U.S. Prov. App. Ser. No. 62/300,621 filed Feb. 26, 2016, the disclosures of both of which are incorporated herein by reference in their entireties.

One or more aspects or features of the subject matter described herein can be realized in digital electronic circuitry, integrated circuitry, specially designed application specific integrated circuits (ASICs), field programmable gate arrays (FPGAs) computer hardware, firmware, software, and/or combinations thereof. These various aspects or features can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device. The programmable system or computing system may include clients and servers. A client and server are generally remote from each other and typically interact through a communication network. The relationship of client and server arises by virtue of computer programs running on the respective computers and having a client-server relationship to each other.

These computer programs, which can also be referred to programs, software, software applications, applications, components, or code, include machine instructions for a programmable processor, and can be implemented in a high-level procedural language, an object-oriented programming language, a functional programming language, a logical programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium can store such machine instructions non-transitorily, such as for example as would a non-transient solid-state memory or a magnetic hard drive or any equivalent storage medium. The machine-readable medium can alternatively or additionally store such machine instructions in a transient manner, such as for example as would a processor cache or other random access memory associated with one or more physical processor cores.

To provide for interaction with a user, one or more aspects or features of the subject matter described herein can be implemented on a computer having a display device, such as for example a cathode ray tube (CRT) or a liquid crystal display (LCD) or a light emitting diode (LED) monitor for displaying information to the user and a keyboard and a pointing device, such as for example a mouse or a trackball, by which the user may provide input to the computer. Other kinds of devices can be used to provide for interaction with a user as well. For example, feedback provided to the user can be any form of sensory feedback, such as for example visual feedback, auditory feedback, or tactile feedback; and input from the user may be received in any form, including, but not limited to, acoustic, speech, or tactile input. Other possible input devices include, but are not limited to, touch screens or other touch-sensitive devices such as single or multi-point resistive or capacitive trackpads, voice recognition hardware and software, optical scanners, optical pointers, digital image capture devices and associated interpretation software, and the like. Such examples are merely for illustration purposes and are not intended to be limiting. In general, the current subject matter relates to approaches for aggregating, analyzing, and further interpreting results into formats consumable by proprietary and third-party applications for further interpretation, display, and the like.

In the descriptions above and in the claims, phrases such as "at least one of" or "one or more of" may occur followed by a conjunctive list of elements or features. The term "and/or" may also occur in a list of two or more elements or features. Unless otherwise implicitly or explicitly contradicted by the context in which it used, such a phrase is intended to mean any of the listed elements or features individually or any of the recited elements or features in combination with any of the other recited elements or features. For example, the phrases "at least one of A and B;" "one or more of A and B;" and "A and/or B" are each intended to mean "A alone, B alone, or A and B together." A similar interpretation is also intended for lists including three or more items. For example, the phrases "at least one of A, B, and C;" "one or more of A, B, and C;" and "A, B, and/or C" are each intended to mean "A alone, B alone, C alone, A and B together, A and C together, B and C together, or A and B and C together." Use of the term "based on," above and in the claims is intended to mean, "based at least in part on," such that an unrecited feature or element is also permissible.

The subject matter described herein can be embodied in systems, apparatus, methods, and/or articles depending on the desired configuration. The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and subcombinations of the disclosed features and/or combinations and subcombinations of several further features disclosed above. In addition, the logic flows depicted in the accompanying figures and/or described herein do not necessarily require the particular order shown, or sequential order, to achieve desirable results. Other implementations may be within the scope of the following claims.

The invention claimed is:
1. A computer-implemented method comprising:
    initially monitoring, by each of a plurality of endpoint computer systems, data relating to a plurality of events occurring within an operating environment of the corresponding endpoint computer system, the monitoring comprising receiving and/or inferring the data according to a first set of data collection criteria using one or more sensors executing on the endpoint computer system;
    storing, for each endpoint computer system, artifacts corresponding to the events within such endpoint computer system in a self-contained vault maintained on such endpoint computer system, the vault comprising an audit log maintained as a series or chain of linked data containers, each of which is encrypted and further secured by a cryptographic fingerprint;
    determining by a machine learning model trained using historical data that a heightened level of alert is necessary;
    subsequently monitoring, by each of the plurality of endpoint computer systems, data relating to the plurality of events occurring within the operating environment of the corresponding endpoint computer system according to a second set of data collection criteria which causes (i) an increased amount of data to be monitored and (ii) a greater amount of artifacts to be stored in the corresponding vaults;

receiving, by more than two of the plurality of endpoint computer systems from a server, a query;

identifying and retrieving, by each endpoint computer systems receiving the query, artifacts within the corresponding vault responsive to the query; and providing, by each endpoint computer system receiving the query to the server, results responsive to the query including or characterizing the identified artifacts.

2. The method of claim 1, further comprising, indexing, by the server, the received results enabling such results to be re-used for subsequent queries without communicating to some or all of the endpoint computer systems.

3. The method of claim 1, wherein the artifacts are a digital item of interest comprising one or more of a file, a program, network connections, registry keys and values, DNS connections, user agent strings, URLs, drivers, services, users, or a system characteristic.

4. The method of claim 1, wherein the monitoring further comprises receiving and/or inferring at least some of the data using additional data generated external to the endpoint computer system and received by the endpoint computer system by way of a communications interface over a communications network.

5. The method of claim 1, wherein the storing of the artifacts-in the vaults further comprises determining, based on one or more criteria, to retain in each vault a first subset of the data as more likely to be relevant to a software-based attack and to exclude from the corresponding vault and a second subset of the data as more likely to be irrelevant to a software-based attack.

6. The method of claim 1, wherein the events comprise actions occurring on the endpoint computer systems and involving at least one artifact on the endpoint computer system and/or wherein the event comprises a capture of what occurred at a specific point in time relating to the at least one artifact.

7. The method of claim 1, wherein the results comprise one or more of one or more times that a particular file was accessed on the corresponding endpoint computer system, how the particular file was used on the corresponding endpoint computer system, when the particular file was first detected on the corresponding endpoint computer system, location of a registry persistence point, and use of a registry by a software routine to allow itself to persist after a reboot of the corresponding endpoint computing system, registry keys being used for malware persistence to survive reboots, files being created or modified with content that can be directly executed or interpreted for execution, files being downloaded that contain executable or interpretable code, processes being created with excessive or unexpected permissions, users with excessive permissions or users obtaining permissions through non-standard mechanisms, network connections that are used in non-standard ways, network connections that are used in ways that exhibit malicious command and control activities, network connections that are used to exfiltrate files that contain sensitive information, network connections that connect to IP addresses that are considered suspect due to geo-location or reputation, processes that exhibit control over or inject code into other processes, and/or processes that change user ownership during execution.

8. The method of claim 1 further comprising:
mitigating an amount of the data returned as part of the responsive results, the mitigating comprising interpreting the query at the endpoint computer system and focusing on specific data of the results that are most likely to be relevant to a subject of the query.

9. The method of claim 1, wherein the monitoring of data is performed by one or more sensors that comprise at least one of a kernel mode collector, a removable media sensor, a sensor that collects data about a current state of a computing environment executing on the endpoint computer, a malware detection and/or interdiction process, a user authentication process, a user authentication re-verification process, system event log collector, or an operation system event log sensor.

10. The method of claim 1 further comprising:
pruning, for each endpoint system, data within the vaults meeting pre-determined deletion criteria.

11. The method of claim 10, wherein the pre-determined deletion criteria is based on a timestamp or time associated with such data or a size of files or objects within such data.

12. A system comprising:
at least one data processor; and
memory storing instructions which, when executed by the at least one data processor, implements operations comprising:
initially monitoring, by each of a plurality of endpoint computer systems, data relating to a plurality of events occurring within an operating environment of the corresponding endpoint computer system, the monitoring comprising receiving and/or inferring the data according to a first set of data collection criteria using one or more sensors executing on the endpoint computer system and;
storing, for each endpoint computer system, artifacts corresponding to the events within such endpoint computer system in a self-contained vault maintained on such endpoint computer system;
determining by a machine learning model trained using historical data that a heightened level of alert is necessary;
subsequently monitoring, by each of the plurality of endpoint computer systems, data relating to the plurality of events occurring within the operating environment of the corresponding endpoint computer system according to a second set of data collection criteria which causes (i) an increased amount of data to be monitored and (ii) a greater amount of artifacts to be stored in the corresponding vaults;
receiving, by more than two of the plurality of endpoint computer systems from a server, a query;
identifying and retrieving, by each endpoint computer systems receiving the query, artifacts within the corresponding vault responsive to the query; and
providing, by each endpoint computer system receiving the query to the server, results responsive to the query including or characterizing the identified artifacts.

13. The system of claim 12 further comprising the plurality of endpoint computer systems and the server.

14. The system of claim 12, wherein the operations further comprise: indexing, by the server, the received results enabling such results to be re-used for subsequent queries without communicating to some or all of the endpoint computer systems.

15. The system of claim 12, wherein the artifacts are a digital item of interest comprising one or more of a file, a program, network connections, registry keys and values, DNS connections, user agent strings, URLs, drivers, services, users, or a system characteristic.

16. The system of claim 12, wherein the monitoring further comprises receiving and/or inferring at least some of the data using additional data generated external to the endpoint computer system and received by the endpoint computer system by way of a communications interface over a communications network.

17. The system of claim 12, wherein the operations further comprise: the vault comprising an audit log maintained as a series or chain of linked data containers, each of which is encrypted and further secured by a cryptographic fingerprint;
   wherein the storing of the artifacts in the vault further comprises determining, based on one or more criteria, to retain in each vault a first subset of the data as more likely to be relevant to a software-based attack and to exclude from the corresponding vault and a second subset of the data as more likely to be irrelevant to a software-based attack.

18. The system of claim 12, wherein the events comprise actions occurring on the endpoint computer systems and involving at least one artifact on the endpoint computer system and/or wherein the event comprises a capture of what occurred at a specific point in time relating to the at least one artifact.

19. A non-transitory computer readable medium storing instructions which, when executed by at least one processor forming part of at least one computing device, result in operations comprising:
   initially monitoring, by each of a plurality of endpoint computer systems, data relating to a plurality of events occurring within an operating environment of the corresponding endpoint computer system, the monitoring comprising receiving and/or inferring the data according to a first set of data collection criteria using one or more sensors executing on the endpoint computer system;
   storing, for each endpoint computer system, artifacts corresponding to the events within such endpoint computer system in a self-contained vault maintained on such endpoint computer system, the vault comprising an audit log maintained as a series or chain of linked data containers, each of which is encrypted and further secured by a cryptographic fingerprint;
   determining by a machine learning model trained using historical data that a heightened level of alert is necessary;
   subsequently monitoring, by each of the plurality of endpoint computer systems, data relating to the plurality of events occurring within the operating environment of the corresponding endpoint computer system according to a second set of data collection criteria which causes (i) an increased amount of data to be monitored and (ii) a greater amount of artifacts to be stored in the corresponding vaults;
   receiving, by more than two of the plurality of endpoint computer systems from a server, a query;
   identifying and retrieving, by each endpoint computer systems receiving the query, artifacts within the corresponding vault responsive to the query; and
   providing, by each endpoint computer system receiving the query to the server, results responsive to the query including or characterizing the identified artifacts.

20. The non-transitory computer readable medium of claim 19, wherein the monitoring of data is performed by one or more sensors that comprise at least one of a kernel mode collector, a removable media sensor, a sensor that collects data about a current state of a computing environment executing on the endpoint computer, a malware detection and/or interdiction process, a user authentication process, a user authentication re-verification process, system event log collector, or an operation system event log sensor.

* * * * *